(12) United States Patent  (10) Patent No.: US 8,137,111 B2
Carda et al.  (45) Date of Patent: Mar. 20, 2012

(54) MODEL HUMAN EYE

(75) Inventors: Dan D. Carda, Tucson, AZ (US); Johan T. W. Van Dalen, Tucson, AZ (US)

(73) Assignee: Eye Care and Cure Pte. Ltd, Singapore (SG)

( * ) Notice: Subject to any disclaimer, the term of this patent is extended or adjusted under 35 U.S.C. 154(b) by 431 days.

(21) Appl. No.: 12/163,838

(22) Filed: Jun. 27, 2008

(65) Prior Publication Data

US 2009/0004637 A1    Jan. 1, 2009

Related U.S. Application Data

(63) Continuation-in-part of application No. 11/770,653, filed on Jun. 28, 2007.

(51) Int. Cl.
   *G09B 23/28*    (2006.01)
(52) U.S. Cl. ........................................... 434/271
(58) Field of Classification Search ............... 434/271
   See application file for complete search history.

(56) References Cited

U.S. PATENT DOCUMENTS

| | | | | |
|---|---|---|---|---|
| 1,042,815 | A * | 10/1912 | Myers | 434/271 |
| 2,670,569 | A * | 3/1954 | Heina | 446/392 |
| 4,710,193 | A * | 12/1987 | Volk | 623/6.23 |
| 5,195,896 | A * | 3/1993 | Sweeney et al. | 434/265 |
| 5,561,137 | A | 10/1996 | Or et al. | |
| 5,893,719 | A | 4/1999 | Radow | |
| 5,964,776 | A | 10/1999 | Peyman | |
| 6,887,083 | B2 | 5/2005 | Umeyama | |
| 6,923,654 | B2 | 8/2005 | Johnson | |
| 2002/0028429 | A1 * | 3/2002 | Umeyama et al. | 434/271 |
| 2004/0097166 | A1 * | 5/2004 | Maddocks et al. | 446/392 |
| 2007/0254841 | A1 * | 11/2007 | Ousler et al. | 514/12 |

OTHER PUBLICATIONS

Leo D. Bores, Ocular Anatomy, Aug. 23, 2002, pp. 3.*
Kolb et al., Gross Anatomy of the Eye, Jan. 20, 2005, pp. 1-2.*
Eeva-Liisa Martola and Jules Baum. Central and Peripheral Corneal Thickness, A Clinical Study. 1968. Archives of Ophthamology, 79(1):28-30.*
Gray, Henry. Anatomy of the human body [20, section 1c.1. The Tunics of the Eye]. 1918. [retreived on Apr. 9, 2011]. Retrieved from the Internet http://www.bartleby.com/107/225.html.*
International Preliminary Report on Patentability dated Sep. 9, 2010.

* cited by examiner

*Primary Examiner* — Xuan Thai
*Assistant Examiner* — Jerry-Daryl Fletcher
(74) *Attorney, Agent, or Firm* — Dale F. Regelman; Nikia L. Gray; Quarles & Brady LLP

(57) ABSTRACT

A model human eye comprising a cylindrical base portion comprising a bowl-shaped substrate disposed therein, and a plurality of retinal layers stacked on the surface of that bowl-shaped substrate. The model eye further comprises a hemispherical-shaped top portion comprising a visually transparent cornea portion and a visually opaque sclera portion comprising an inner surface, an annular iris continuously attached to the inner surface and extending inwardly therefrom, and a lenticular bag continuously attached to the iris, wherein the iris in combination with the lenticular bag and the cornea portion define an anterior chamber. The top portion is attached to the base portion to define a posterior chamber.

18 Claims, 16 Drawing Sheets

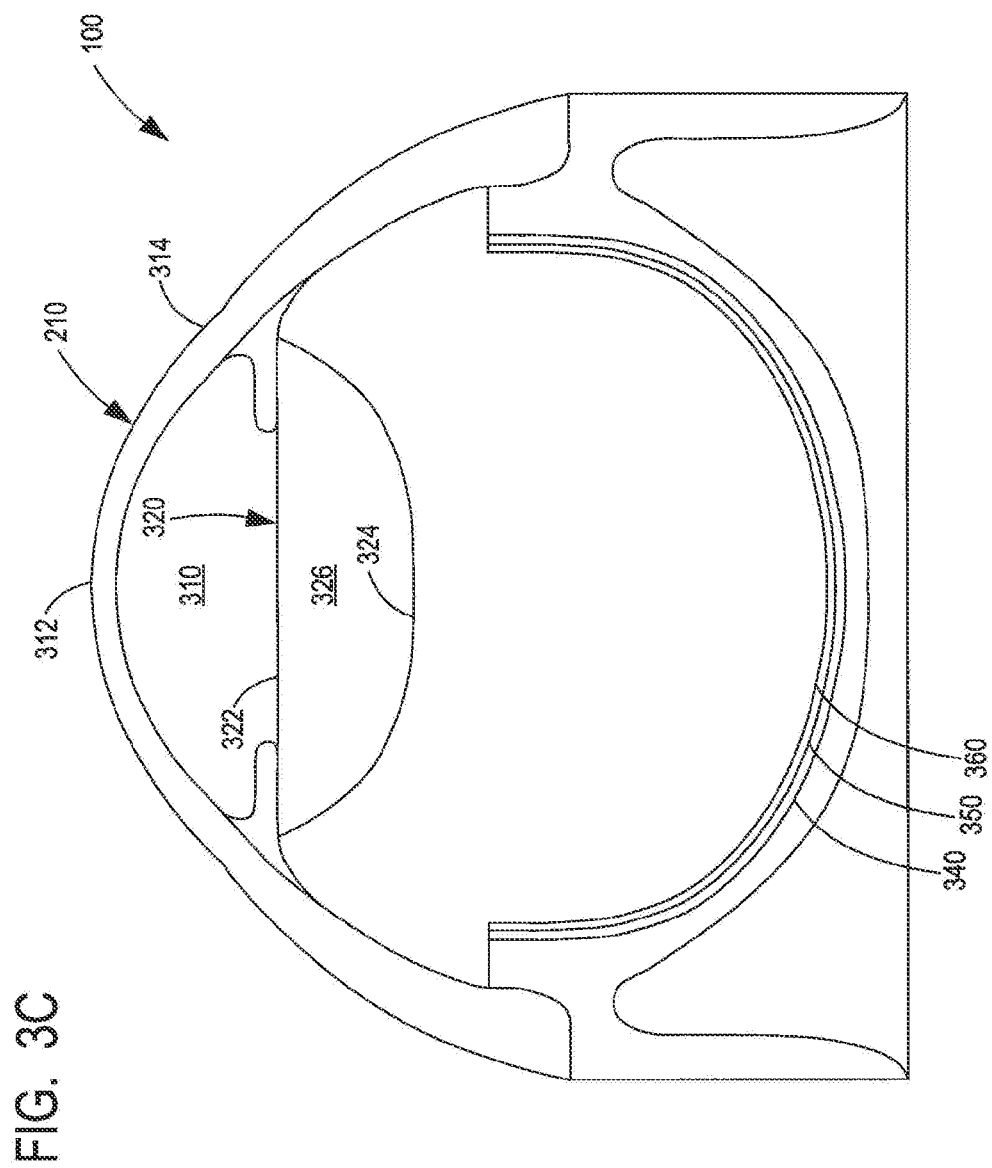

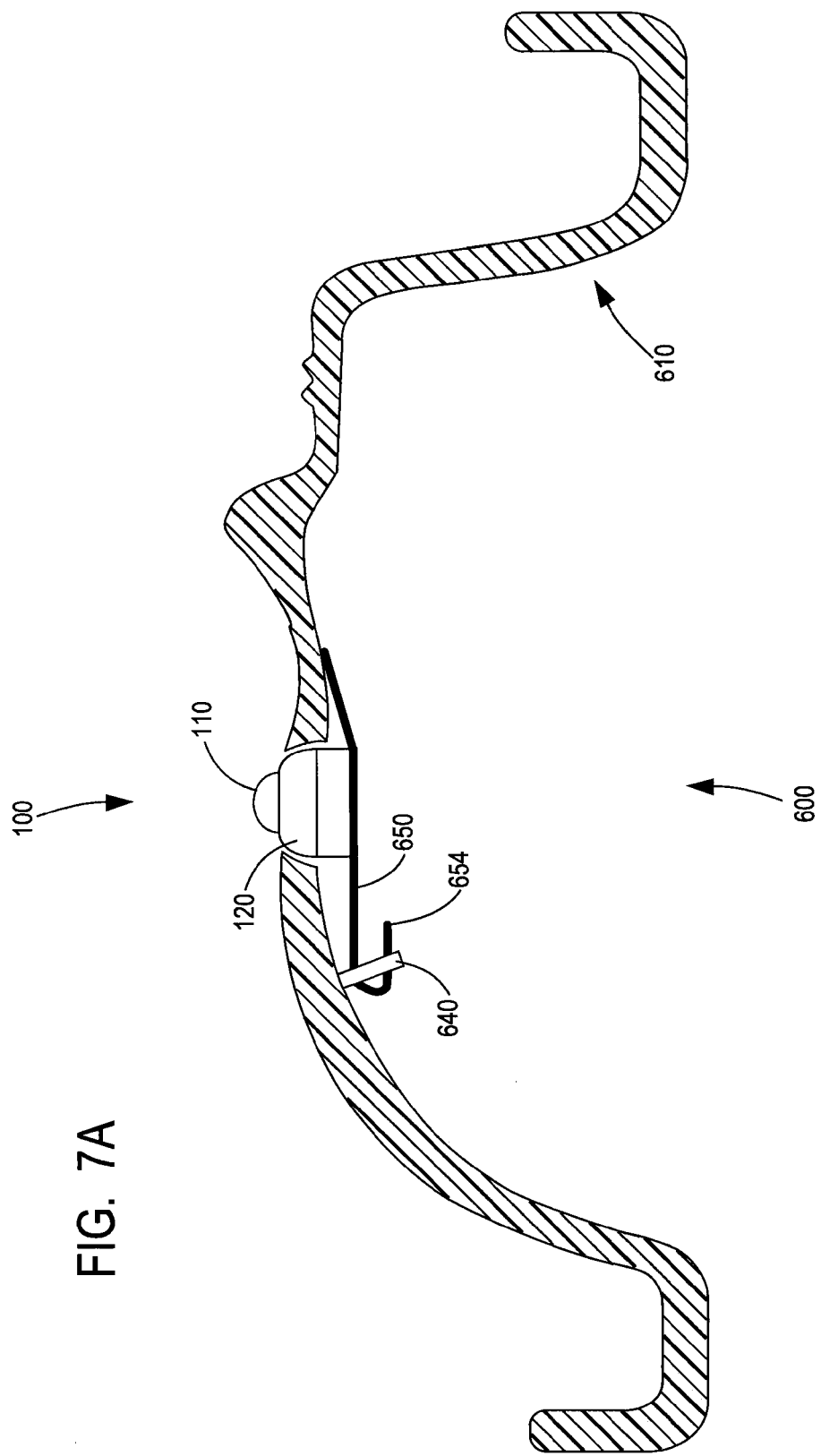

MODEL HUMAN EYE

CROSS REFERENCE TO RELATED APPLICATIONS

This application is a Continuation-In-Part claiming priority from a U.S. Utility application filed Jun. 28, 2007, and having Ser. No. 11/770,653, which is hereby incorporated by reference herein.

FIELD OF THE INVENTION

This invention relates to a model human eye for pedagogical use by medical professionals.

BACKGROUND OF THE INVENTION

Medical students, interns, residents, and fellows, specializing in diagnosing and treating injuries to, and the diseases of, the eye must necessarily practice certain surgical techniques on various models of the human eye prior to actually operating on human patients. Prior art training methods often use animal eyes, such as, for example human cadaver eyes or cow eyes.

The use of human cadaver and/or animal eyes (collectively "biological eyes") is burdened with many procedural issues. The biological eyes must be refrigerated before use, and even when refrigerated suffer from a short "shelf life" due to inevitable biological decomposition. The handling of such biological eyes requires compliance with, among other regulations, the Blood Born Pathogens Standard promulgated under the federal Occupational Health and Safety Act. After use, the biological eyes must be properly disposed of.

What is needed is a model human eye that closely mimics the anatomy and physiology of the human eye, but which does not require refrigeration and other special handling procedures.

SUMMARY OF THE INVENTION

Applicants' invention comprises a model human eye that can be used for surgical training purposes. The model eye comprises a cylindrical base portion comprising a bowl-shaped substrate disposed therein, and a plurality of retinal layers stacked on the surface of that bowl-shaped substrate. The model eye further comprises a hemi-spherical-shaped top portion comprising a visually transparent cornea portion and a visually opaque sclera portion comprising an inner surface, an annular iris continuously attached to the inner surface and extending inwardly therefrom, and a lenticular bag continuously attached to the iris, wherein the iris in combination with the lenticular bag and the cornea portion define an anterior chamber.

The top portion is attached to the base portion to define a posterior chamber. The model eye further comprises a first fluid disposed in the anterior chamber, wherein said first fluid comprises a first viscosity, and a second fluid disposed in the posterior chamber, wherein that second fluid comprises a second viscosity, wherein the second viscosity is greater than the first viscosity.

Applicants' invention further comprises a face manikin formed to mimic a human-face comprising a raised, face-mimicking structure surrounded by a trough, wherein the face-mimicking structure comprises two eye sockets extending therethrough, an exterior surface, and an interior surface, two attachment straps wherein each attachment strap comprises a first end attached to said interior surface adjacent one of the eye sockets, two attachment buckles wherein each attachment buckle attached to said interior surface adjacent one of the eye sockets. The exterior surface of the face-mimicking structure comprises an eye brow element disposed adjacent a first side of each eye socket, a nose feature disposed between the eye sockets and adjacent a second an opposing side of the eye sockets, and a mouth feature disposed adjacent the nose feature.

One or two model eyes can be releaseably disposed in the face manikin such that a cornea portion extends outwardly through an eye socket. Various surgical procedures can be practiced using one or both of the model eyes. The used model eyes can then be removed from the face manikin, and those used model eyes can be retained for study or discarded. New model eyes can be disposed in the face manikin and the surgical procedure practiced a plurality of times.

BRIEF DESCRIPTION OF THE DRAWINGS

The invention will be better understood from a reading of the following detailed description taken in conjunction with the drawings in which like reference designators are used to designate like elements, and in which:

FIG. 3C is a third cross-sectional view of Applicants' model eye showing two retinal layers;

FIG. 7A shows the face manikin of FIG. 6A with a model human eye removeably affixed thereto.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicants' invention comprises a model human eye that closely mimics the anatomy and physiology of the human eye. Moreover, Applicants' invention allows physicians to practice surgical procedures utilizing their own equipment and instruments. This being the case, training methods utilizing Applicants' model human eye closely mimic surgical procedures performed on actual patients.

Figure 1:
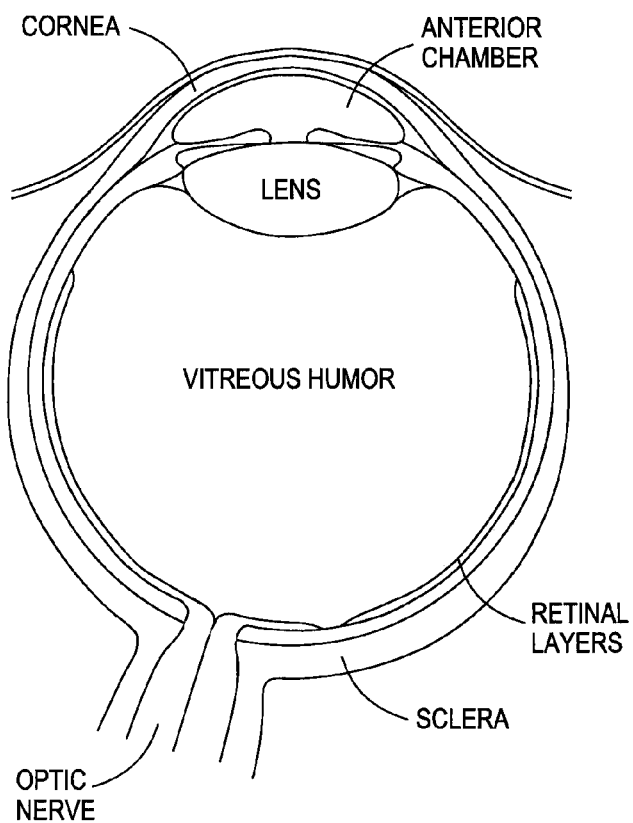
FIG. 1 illustrates a human eye.

Referring now to FIG. 1, the human eye comprises outer layers which include the cornea and the sclera. These layers enclose an anterior chamber disposed in front of the lens, and a larger posterior chamber disposed behind the lens. The anterior chamber is filled with a watery aqueous humor, and the posterior chamber is filled with a jelly-like vitreous body.

Figure 2:
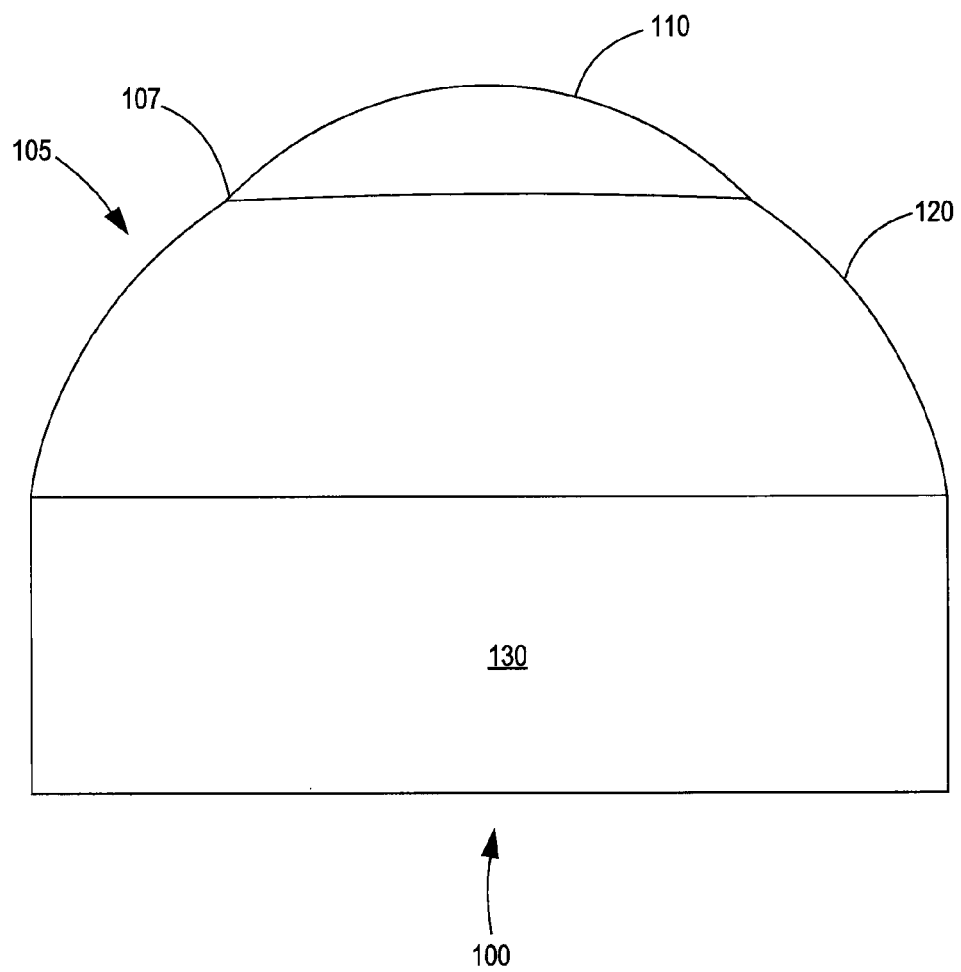
FIG. 2 is a perspective view of Applicants' model eye.

Referring now to FIG. 2, Applicants' model human eye 100 is formed from subassemblies 105 and 130. Sub-assembly 105 comprises cornea portion 110 and sclera portion 120. In certain embodiments, assembly 105 is molded as an integral part. In certain embodiments, assembly 105 is formed by liquid injection molding. In certain embodiments, assembly is formed by injection molding a silicone resin. In certain embodiments, that silicone resin comprises polydimethylsiloxane. In certain embodiments, that silicone resin comprises an elastomeric polydimethylsiloxane.

In certain embodiments, the portion of the mold used to form sclera portion 120 comprises a plurality of microscopic protuberances, i.e. a relatively "rough" surface microscopically. As a result, the molded sclera portion 120 diffracts visible light, and therefore, is visually opaque. In contrast, the portion of the mold used to mold cornea portion 110 does not comprise such microscopic roughness. As a result, cornea portion 110 comprises a smooth surface and does not diffract visible light, and is visually transparent. Border 107 defines the intersection of transparent cornea portion 110 and visually opaque sclera portion.

Figure 3A:
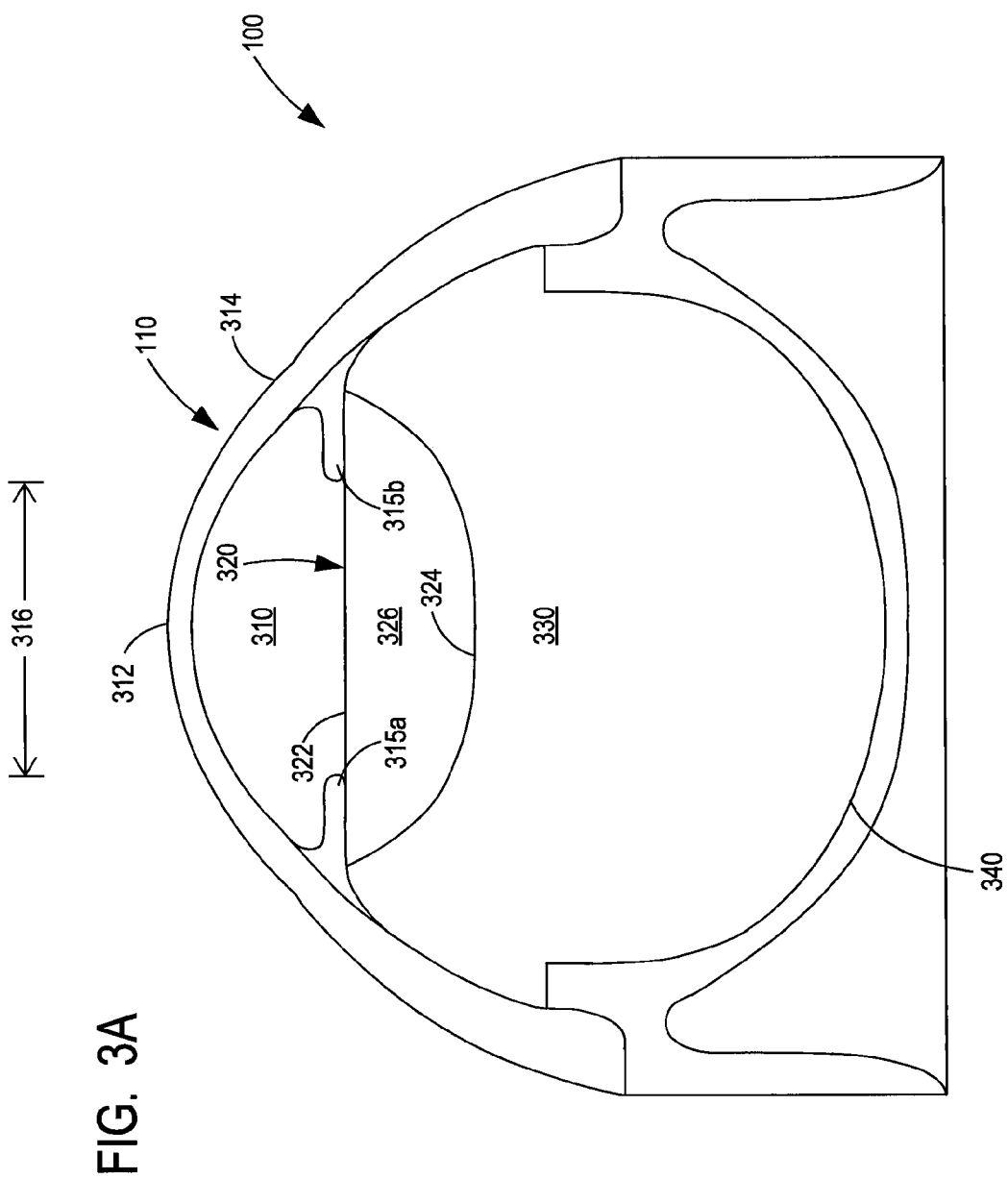
FIG. 3A is a first cross-sectional view of Applicants' model eye.

Referring now to FIG. 3A, a human cornea comprises a varying thickness, wherein that thickness is greatest at the periphery and decreases to a minimum thickness in the middle. Cornea portion 110 is formed to mimic the varying thickness of the human cornea. Cornea portion 110 comprises center point 312. Cornea portion 110 is formed to comprise a minimum thickness between about 0.45 mm and about 0.55 mm at center point 312. Cornea portion 110 is formed to comprise a maximum thickness of between about 0.6 mm and about 0.8 mm at periphery 314 of cornea 110.

Applicants' model eye 100 further comprises iris 315 and a lenticular bag 320 disposed therein. FIG. 3A shows iris portion 315a and iris portion 315b. As those skilled in the art will appreciate, iris portions 315a and 315b are each disposed in a continuous, annular iris element, wherein that annular iris element is continuously attached to an inner surface of assembly 105 along border 107. In certain embodiments the distal ends of iris portions 315a and 315b are separated by a distance 316. Distance 316 can be varied. In certain embodiments, distance 316 is 8 mm.

Lenticular bag 320 is continuously attached to iris 315. Iris in combination with said lenticular bag and with a portion of the inner surface of assembly 105 disposed above the iris define anterior chamber 310. Anterior chamber 310 is filled with a first fluid having a first viscosity. In certain embodiments, the first fluid comprises a viscosity of water.

In the illustrated embodiment of FIG. 3A, Applicants lenticular bag 320 comprises anterior capsular membrane 322 and posterior capsular membrane 324. In certain embodiments, anterior capsular membrane 322 is formed from Mylar "A". In certain embodiments, anterior capsular membrane 322 comprises a thickness of about 0.01 mm.

In certain embodiments posterior capsular membrane 324 comprises a hemi-spherical shape. In certain embodiments, posterior capsular membrane comprises a parabolic shape. In certain embodiments, posterior capsular membrane 324 is formed from glycol-modified polyethylene terephthalate. In certain embodiments, posterior capsular membrane 324 comprises a thickness of about 0.25 mm.

Lenticular bag 320 is filled with fluid 326. Fluid 326 is adjusted such that lenticular bag 320 mimics the physical attributes of a human lens. In certain embodiments, fluid 326 comprises an aqueous solution comprising gelatin. In certain embodiments, fluid 326 comprises gelatin, agar, propylene glycol, water, and a preservative. In certain embodiments, fluid 326 further comprises a colorant. In certain embodiments, that colorant comprises a yellow tint. In certain embodiments, that colorant comprises a gray tint. In certain embodiments, the colorant is selected such that lenticular bag 320 mimics a lens found in an elderly human patient.

Figure 3B:
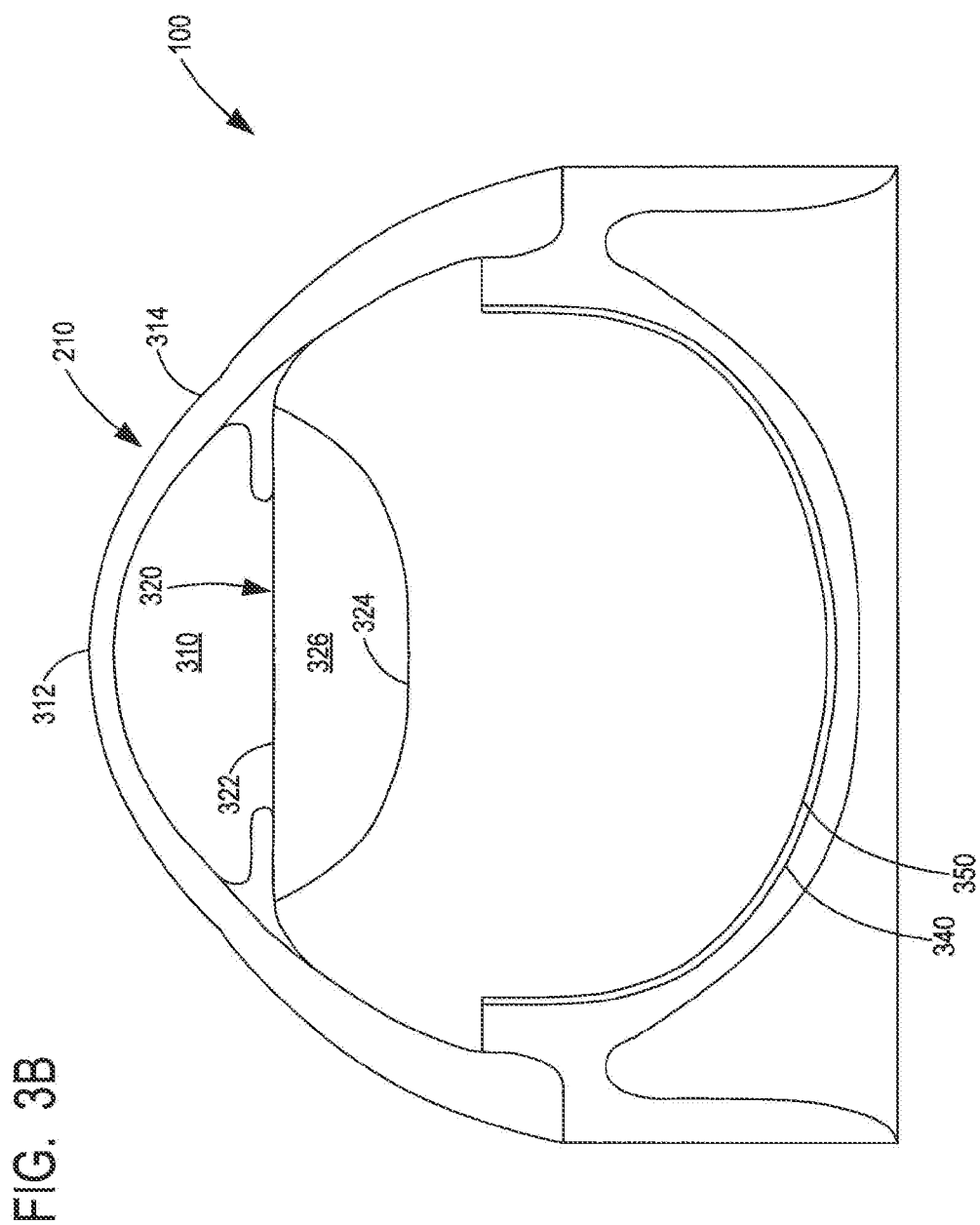
FIG. 3B is a second cross-sectional view of Applicants' model eye showing one retinal layer.
Figure 3D:
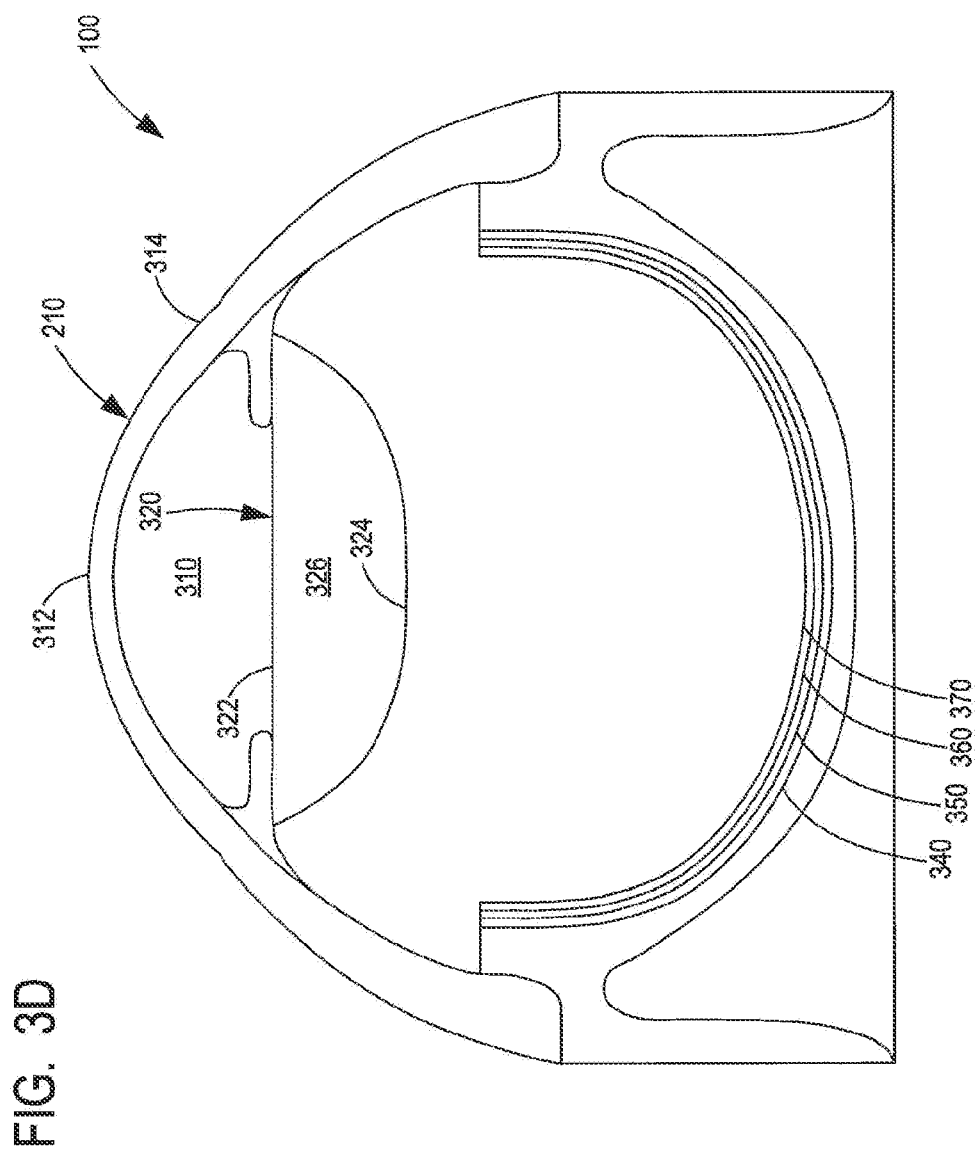
FIG. 3D is a fourth cross-sectional view of Applicants' model eye showing three retinal layers.
Figure 3E:
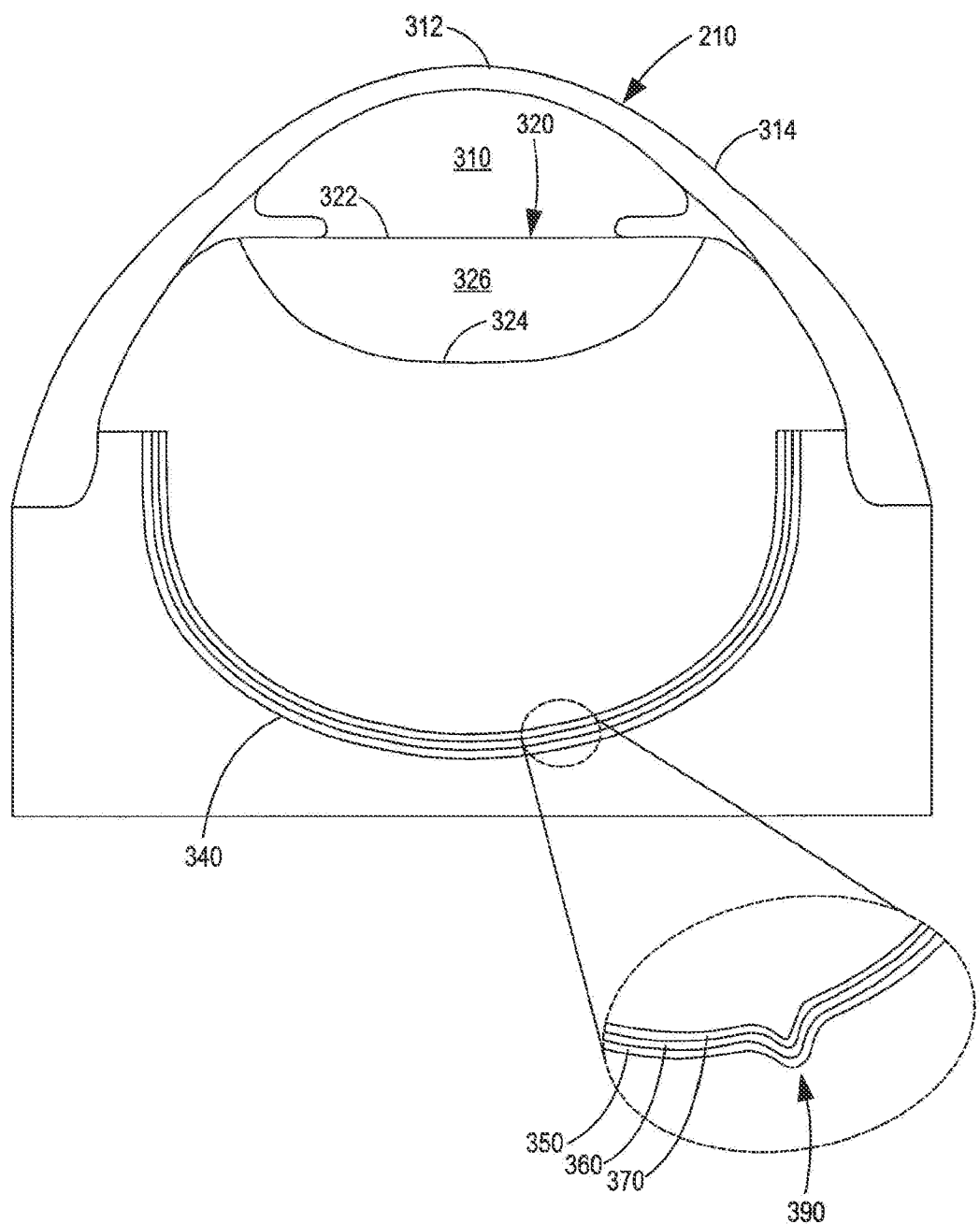
FIG. 3E is a cross-sectional view of Applicants' model showing the three retinal layers of FIG. 3D formed to comprise a dimple in the vicinity of the macula.
Figure 3F:
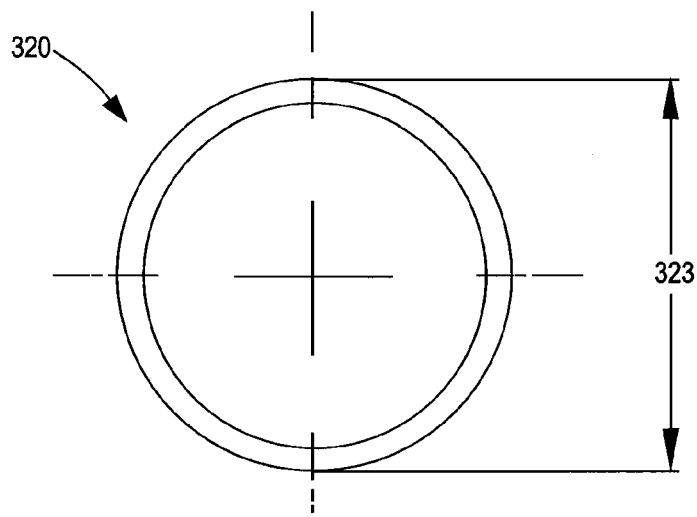
FIG. 3F is a top view of Applicants' lenticular bag.
Figure 3G:
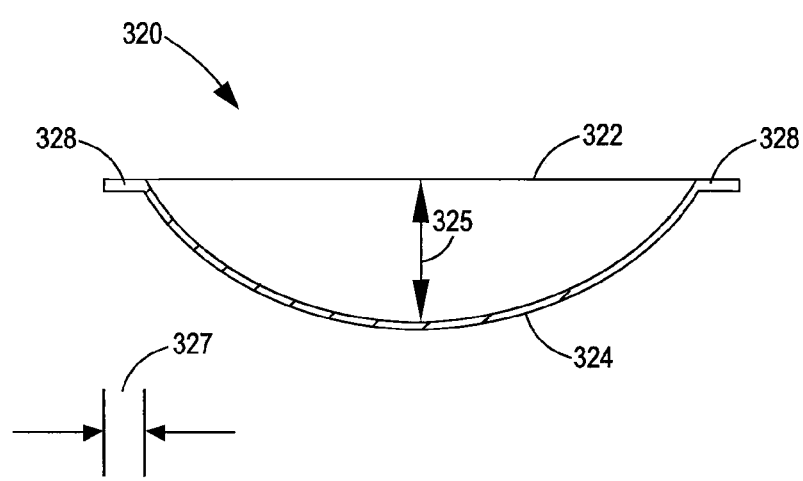
FIG. 3G is a side view of Applicants' lenticular bag.

Referring now to FIGS. 3F and 3G, anterior capsular membrane 322 of lenticular bag 320 comprises a circular surface area, wherein that circular surface comprises a diameter 323. In certain embodiments, diameter 323 is about 12.5 mm. Rim element 328 comprises a width 327. In certain embodiments, width 327 is about 0.7 mm. Posterior capsular membrane 324 is attached to anterior capsular membrane 322 adjacent and inwardly of rim 328. Posterior capsular membrane 324 is disposed a maximum distance 325 from anterior capsular membrane 322. In certain embodiments, distance 325 is about 3 mm. In other embodiments, distance 325 is between about 4 mm to about 5 mm to simulate the anatomy of older patients.

Filled lenticular bag 320 mimics the capsule surrounding a the lens in the human eye. In a normal human eye, the lens is surrounded by a capsule which separates the lens from the vitreous, which is a third fluid disposed in chamber 330 located in the back of the eye, and the aqueous, which is the first fluid disposed in anterior chamber 310 located in the front of the eye. The second fluid disposed in posterior chamber 330 comprises a second viscosity, wherein the second viscosity is greater than the first viscosity. This capsule comprises an anterior portion separating the lens from the aqueous humor, and a posterior portion separating the lens from the vitreous humor.

Referring now to FIGS. 1A, 3A, and 3D, the human eye comprises a plurality of retinal layers disposed along the posterior interior surface. Applicants' model eye 100 similarly comprises a plurality of layers, namely layers 350, 360, and 370, disposed in a stack disposed on the curved surface 340 of posterior chamber 330. In certain embodiments, layer 370 comprises a blue color. In certain embodiments, layer 360 comprises a white color. In certain embodiments, layer 350 comprises a red color. In certain embodiments, each layer 350, 360, and 370, are separately formed. In certain embodiments, layers 350, 360, and 370, comprise a thickness between about 0.0002 to about 0.0006 inches.

Referring now to FIGS. 3A and 3B, Applicant utilizes a process wherein a sprayable RTV silicone formulation in combination with a suitable catalyst is sprayed against the curved portion 340 of the posterior chamber 340 to form first retinal layer 350 having a thickness between about 0.0002 to about 0.0006 inches. In certain embodiments, layer 350 was formed using Dow Corning 3110 RTV Silicone Rubber with either Dow Corning RTV Catalyst #4 for fast sets or Catalyst #1 for slower setting.

Referring now to FIGS. 3B and 3C, after first retinal layer 350 was completely cured, Applicant sprayed a RTV silicone formulation in combination with a suitable catalyst onto first retinal layer 350 to form second retinal layer 360 having a thickness between about 0.0002 to about 0.0006 inches. In certain embodiments, second retinal layer 360 was formed using Dow Corning 3110 RTV Silicone Rubber with either Dow Corning RTV Catalyst #4 for fast sets or Catalyst #1 for slower setting.

Referring now to FIGS. 3C and 3D, after second retinal layer 360 was completely cured, Applicant sprayed a RTV silicone formulation in combination with a suitable catalyst onto second retinal layer 360 to form third retinal layer 370 having a thickness between about 0.0002 to about 0.0006 inches. In certain embodiments, second retinal layer 370 was formed using Dow Corning 3110 RTV Silicone Rubber with either Dow Corning RTV Catalyst #4 for fast sets or Catalyst #1 for slower setting.

Layer 370 corresponds to an Epi-retinal membrane ("ERM"), sometimes referred to as a "macular pucker." ERM comprises a cellophane-like membrane that forms over the macula. ERM represents a slow-progressing problem that affects the central vision by causing blur and distortion. As it progresses, the traction of the membrane on the macula may cause swelling.

ERM is seen most often in people over 75 years of age. It usually occurs for unknown reasons, but may be associated with certain eye problems such as: diabetic retinopathy, posterior vitreous detachment, retinal detachment, trauma, and the like.

A procedure called a membrane peel is performed when vision has deteriorated to the point that it is impairing the patient's lifestyle. Most vitreo-retinal surgeons recommend waiting for treatment until vision has decreased to the point that the risk of the procedure justifies the improvement. The membrane peel is performed under a local anesthesia in an operating room. The membrane peel is often done in conjunction with a procedure called a vitrectomy.

The ERM membrane is cut into pieces using a plurality of tiny incisions. The pieces of the ERM membrane are then removed by suction. Such an ERM membrane peel operation can be practiced using Applicants' model eye 100. A successful ERM peel is evidenced by removal of the blue layer 370 with no removal of the underlying white layer 360.

White colored layer 360 corresponds to the internal limiting membrane. The inner limiting membrane separates the retina from the vitreous fluid disposed in the posterior chamber 330.

Red-colored layer 350 corresponds to a choroidal neovascular membrane ("CNVM"). The development of a CNVM is practically synonymous with the term "wet" age related macular degeneration (AMD). However, CNVM does occur with other disorders, such as presumed ocular histoplasmosis (POH), pseudoxanthoma elasticum, Paget's disease, myopic retinal degeneration, and other less common disorders. A CNVM is ultimately the result of a break in a structural layer beneath the retina known as Bruch's membrane, which separates the nourishing vascular layer called the choroid from the retina. A break in Bruch's membrane may allow the ingrowth of vessels from the choroid to a position just beneath the retina. These vessels may then leak fluid or blood, initially distorting or blurring vision, and may eventually lead to scarring in the macula and severe loss of central vision. Applicants' model eye 100 can be used to practice surgical treatment of a CNVM.

Referring to FIG. 3E, in certain embodiments substrate 240 is formed to include a dimple 390 extending inwardly from its surface to mimic the macula. As those skilled in the art will appreciate, the macula is located on the temporal side of the optic nerve. In the illustrated embodiment of FIG. 3E, layers 350, 360, and 370, also comprise a dimple feature in the vicinity of the macala.

Figure 4A:
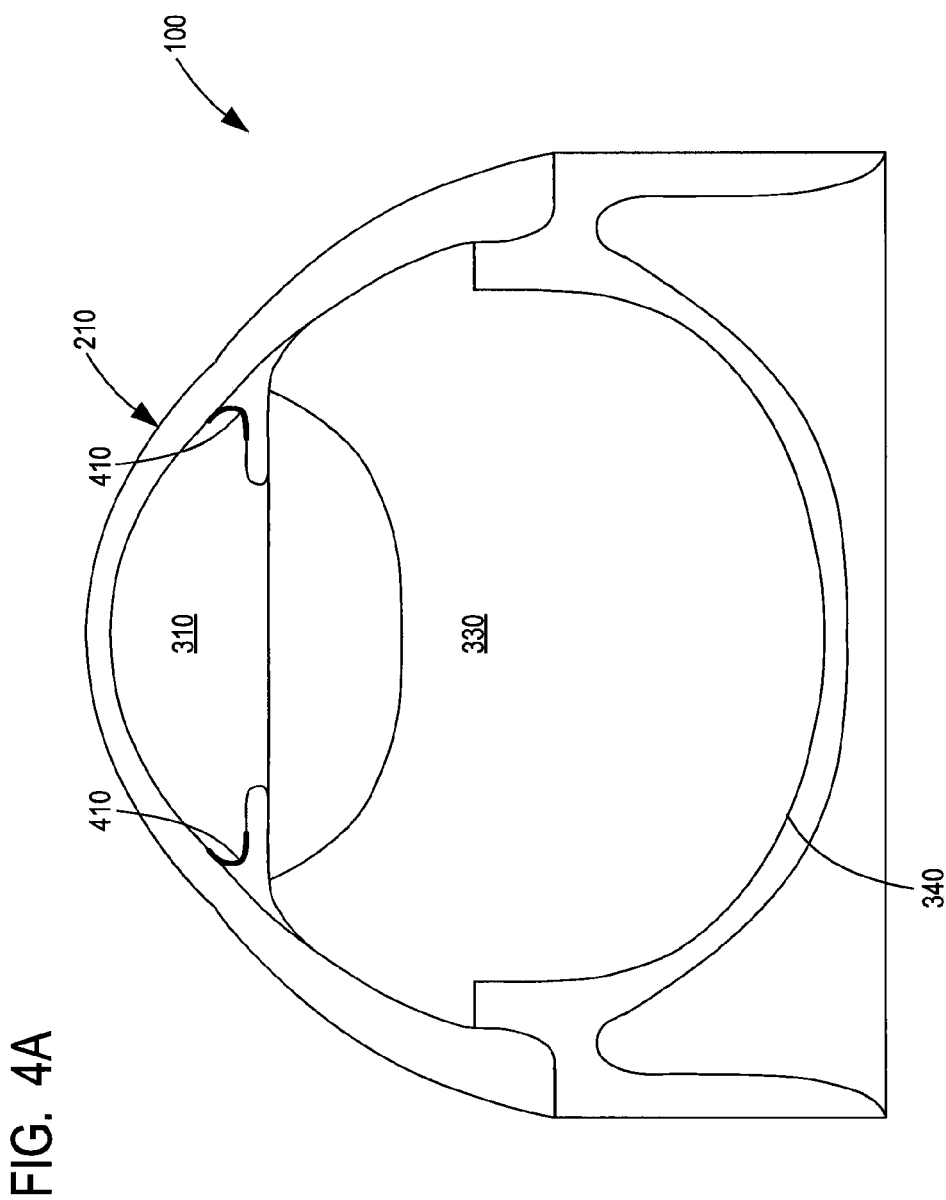
FIG. 4A is a cross-sectional view of Applicants' model eye which includes a trabecular meshwork.
Figure 4B:
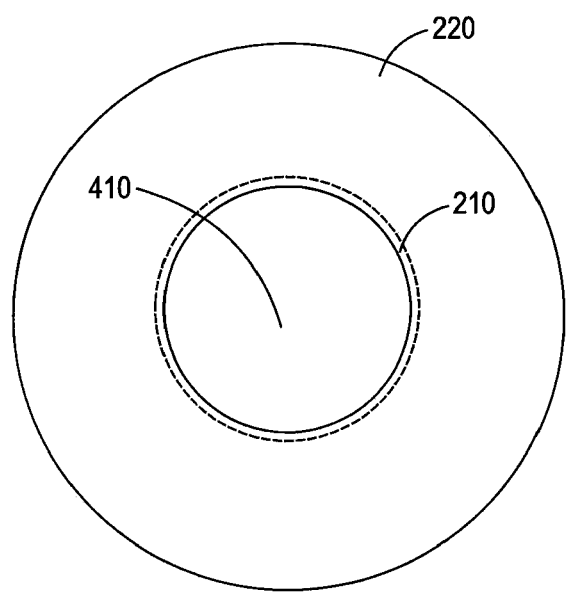
FIG. 4B is a top view of Applicants' model eye which includes a trabecular meshwork.

Referring now to FIGS. 4A and 4B, in certain embodiments Applicants' model eye 100 comprises trabecular meshwork 410. The trabecular meshwork 410 is an area of tissue in the eye located around the base of the cornea, near the ciliary body, and is responsible for draining the aqueous humor from the eye via the anterior chamber (the chamber on the front of the eye covered by the cornea). The tissue is spongy and lined by trabeculocytes; it allows fluid to drain into a set of tubes called Schlemm's canal flowing into the blood system.

Argon laser trabeculoplasty (ALT) is a procedure which has been proven to be efficacious for different types of glaucoma. The procedure has been used for many years and continues to be a powerful tool in the armamentarium of ophthalmologists for glaucoma treatment. ALT is often recommended when medical therapy alone is insufficient in controlling pressure and the progression of glaucoma. However, it has recently been advocated by some as primary therapy in the treatment of glaucoma, especially for those patients who have contraindications to glaucoma medications or, for any reason, are unable to use eye drops.

Figure 4C:
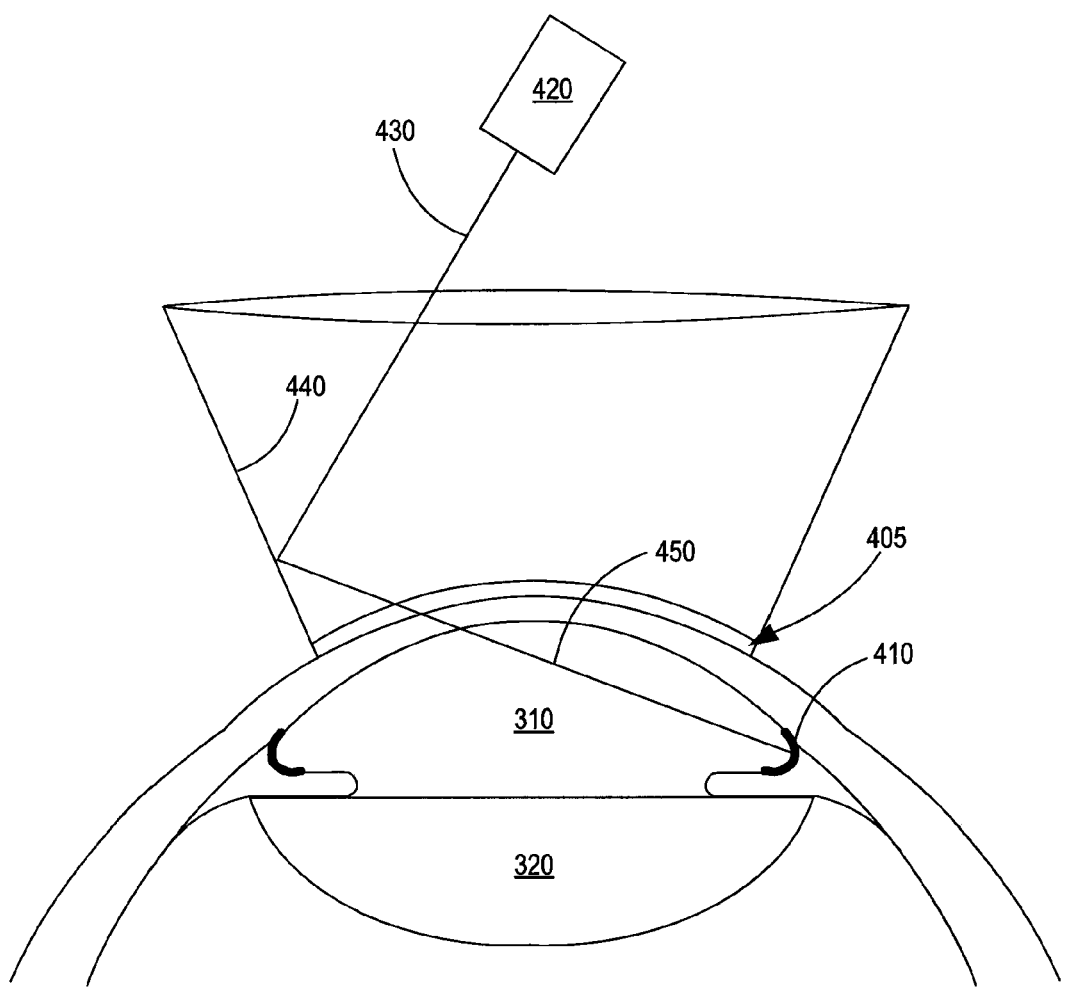
FIG. 4C illustrates a laser treatment for glaucoma using Applicants' model eye.

Referring now to FIG. 4C, in the ALT procedure a procedure contact lens 400 is placed over the cornea, and lasing device 420 is positioned such that laser beam 430 is reflected from reflector 440, and reflected laser beam 450 is directed into the trabecular meshwork 410, which is the primary aqueous (fluid) drainage region of the eye. In most cases, 360 degrees of the trabecular meshwork 410 is treated with laser spots during two sessions wherein each session treats 180 degrees. Each session typically requires about 40 to 80 laser applications.

The effect of the procedure is increased drainage of aqueous fluid out of the eye, thereby lowering the intraocular pressure. The embodiment of Applicants' model eye 100 shown in FIGS. 4A, 4B, and 4C, can be used by eye surgeons to practice the ALT procedure.

Figure 5:
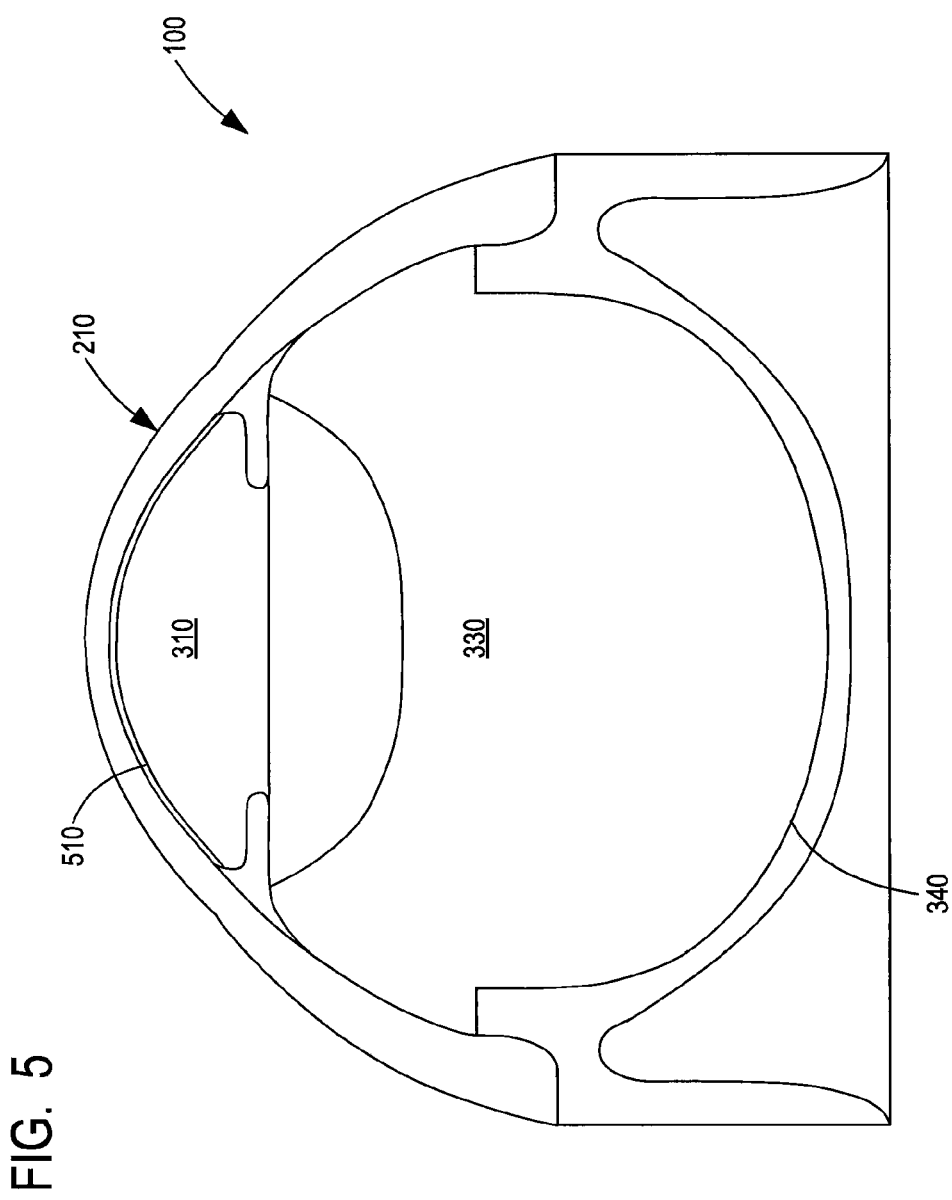
FIG. 5 is a cross-sectional view of Applicants' model eye which includes an endothelium layer.

In the illustrated embodiment of FIG. 5, Applicants' model eye 100 comprises an endothelium layer 510. Descemet's membrane is the basement membrane that lies between the corneal proper substance, also called stroma, and the endothelial layer 510 of the cornea. The endothelial layer is located at the posterior portion of the cornea. Descemet's membrane, as the basement membrane for the endothelial layer, is secreted by the single layer of cuboidal epithelial cells that compose the endothelial layer of the cornea. Its thickness ranges from 3 µm at birth to 8-10 µm in adults.

Endothelial dysfunction from disease or trauma is one of the leading indications for corneal transplantation. Over the past 100 years, one solution for endothelial replacement was through full thickness corneal transplantation. While penetrating keratoplasty (PK) has been shown to yield healthy donor tissue with good endothelial function, this procedure has been plagued by the inherent problems of unpredictable surface topography, retained surface sutures, poor wound strength, and graft rejections.

A surgical technique known as Deep Lamellar Endothelial Keratoplasty (DLEK) accomplishes the goal of endothelial replacement without ever touching the surface of the recipient cornea. By eliminating surface corneal sutures and incisions, the advantages of normal corneal topography and faster wound healing were obtained, leading to faster visual rehabilitation and a more stable globe for the patient.

"Descemets Stripping Endothelial Keratoplasty", or "DSEK" has the advantage of being easier for the surgeon to perform and of providing a smoother interface on the recipient side for the visual axis. Using the DSEK procedure, the endothelial layer 510 is stripped away, and a replacement layer is transplanted. The embodiment of Applicants' model eye 100 shown in FIG. 5 can be used to practice the DSEK procedure.

Figure 6A:
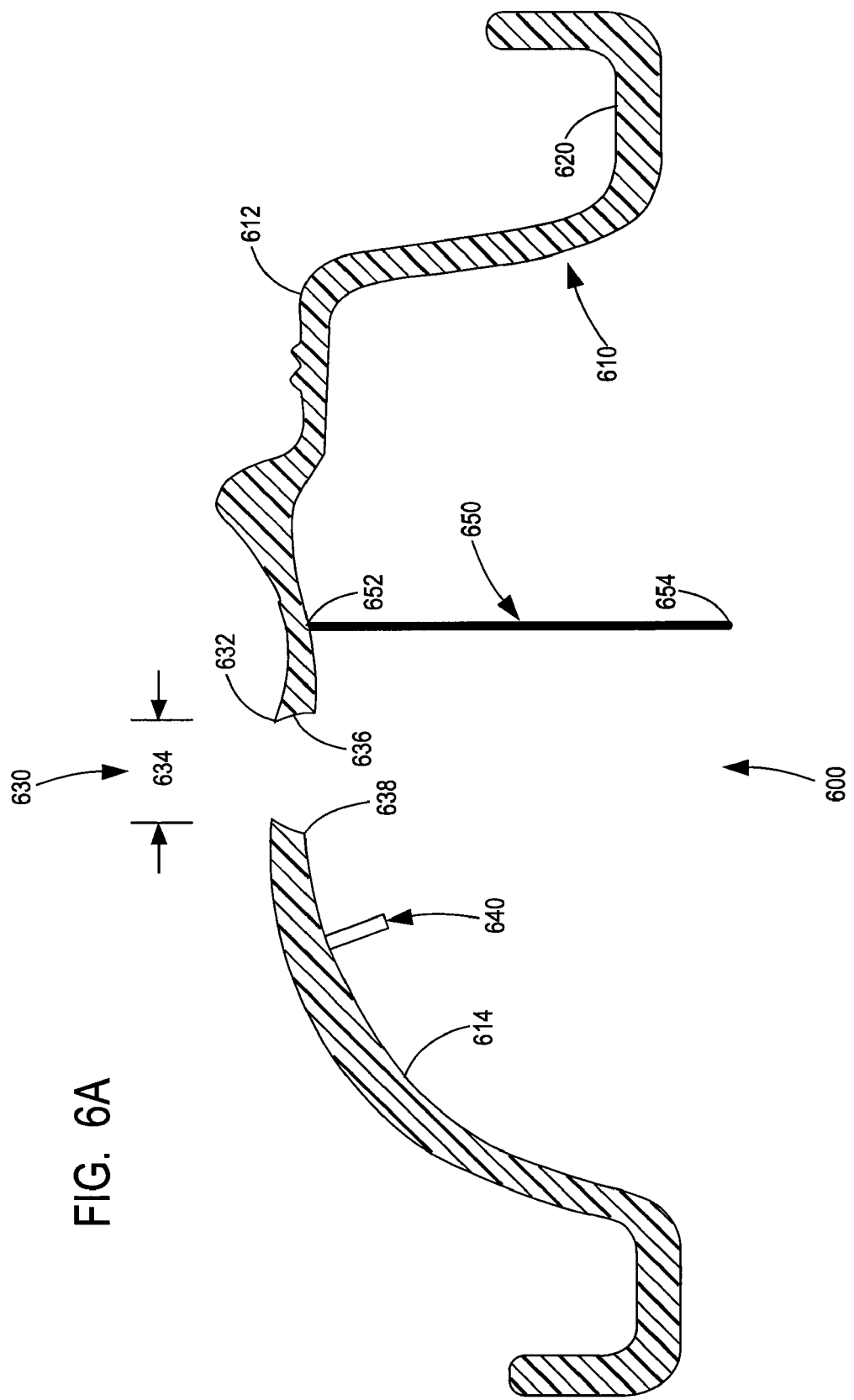
FIG. 6A is a cross-sectional view of Applicants' face manikin formed to releaseably accept Applicants' model human eye.
Figure 6B:
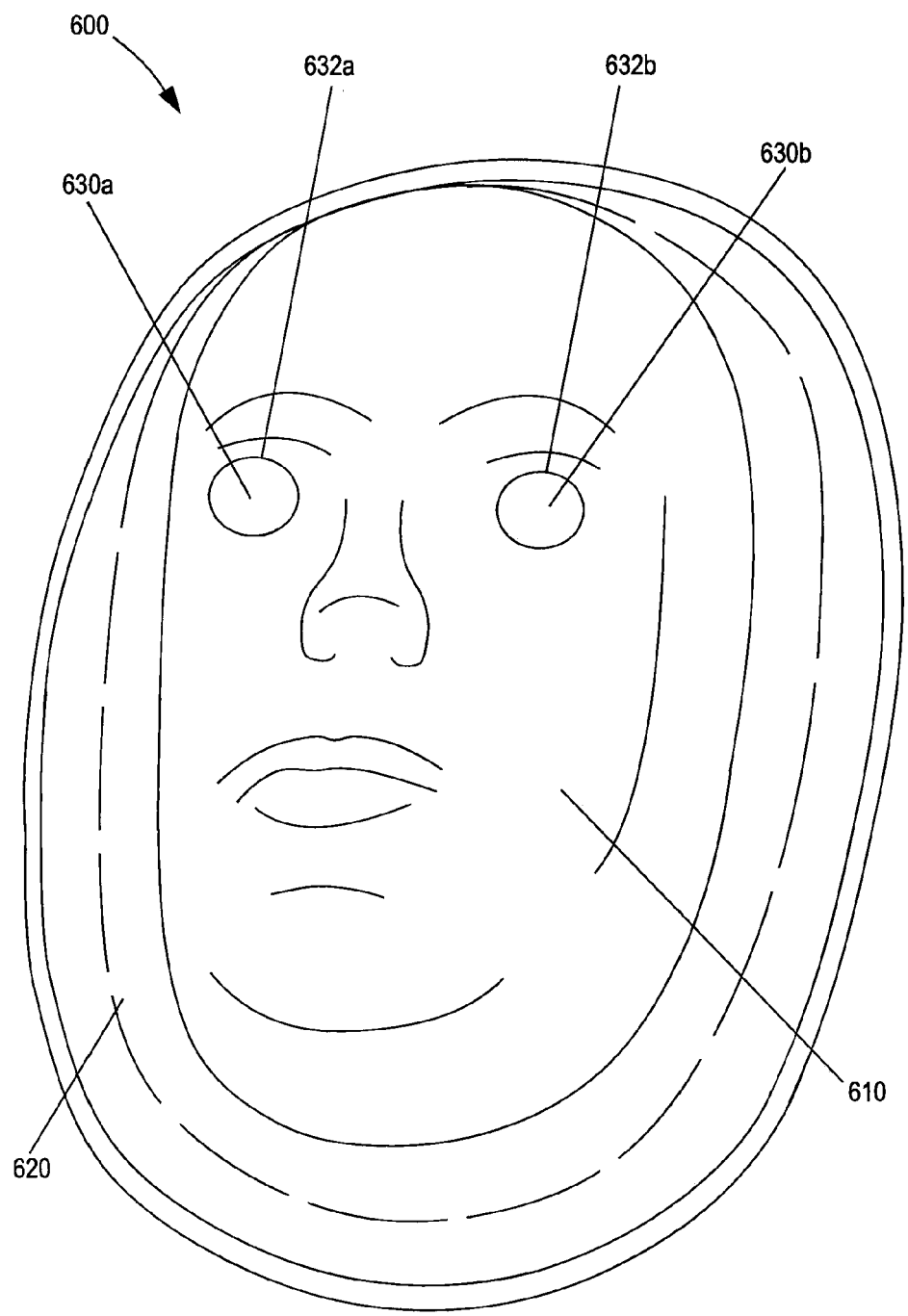
FIG. 6B is a perspective view of the face manikin of FIG. 6A.

Referring now to FIGS. 6A and 6B, in certain embodiments Applicants' invention further comprises a face manikin 600 formed to mimic a human-face. Face manikin 600 comprises a raised, face-mimicking structure 610 surrounded by a trough 620. Many of the surgical procedures that can be learned and refined using Applicants' model eye 100 in combination with face manikin 600 involve the use of water and/or other fluids. As those fluids drain down structure 610, trough 620 comprises an integral containment system to capture those fluids.

Face-mimicking structure 610 comprises an outer surface 612 and an inner surface 614. Face-mimicking structure 610 is formed to include two apertures 630 formed therein. Apertures 630 comprise eye sockets. eye socket 630 comprises a diameter 634. In certain embodiments, diameter 634 is about 20 mm.

In the illustrated embodiment of FIG. 6A, eye socket 630 is defined by a circular wall 636. Circular wall 636 comprises an arcuate shape comprising a first circumference 632 at outer surface 612 and a second circumference 638 at inner surface 614, wherein the first circumference 632 is less than the second circumference 638. In certain embodiments, arcuate wall 636 comprises a radius of curvature of about 12 mm.

The arcuate shape of wall 636 allows Applicants' model eye 100, when fixtured to face manikin 600, to be manually rotated in small increments with respect to the surrounding eye socket 630. Such movement of Applicants' model eye 100 within eye socket 630 closely mimics the actual movement of a human eye.

Face manikin 600 further comprises a flexible attachment strap 650, wherein a first end of strap 650 is attached to interior surface 614. Face manikin 600 further comprises a buckle assembly attached to interior surface 614, wherein buckle assembly 640 is attached to interior surface 614 adjacent a first side of eye socket 630, and one end of flexible strap 650 is attached to interior surface 614 adjacent an opposing second side of eye socket 630. In certain embodiments, one surface of distal end 654 of strap 650 comprises a plurality of loop-type fasteners, and a second and opposing surface of distal end 654 comprises a plurality of hook-type fasteners.

Figure 7B:
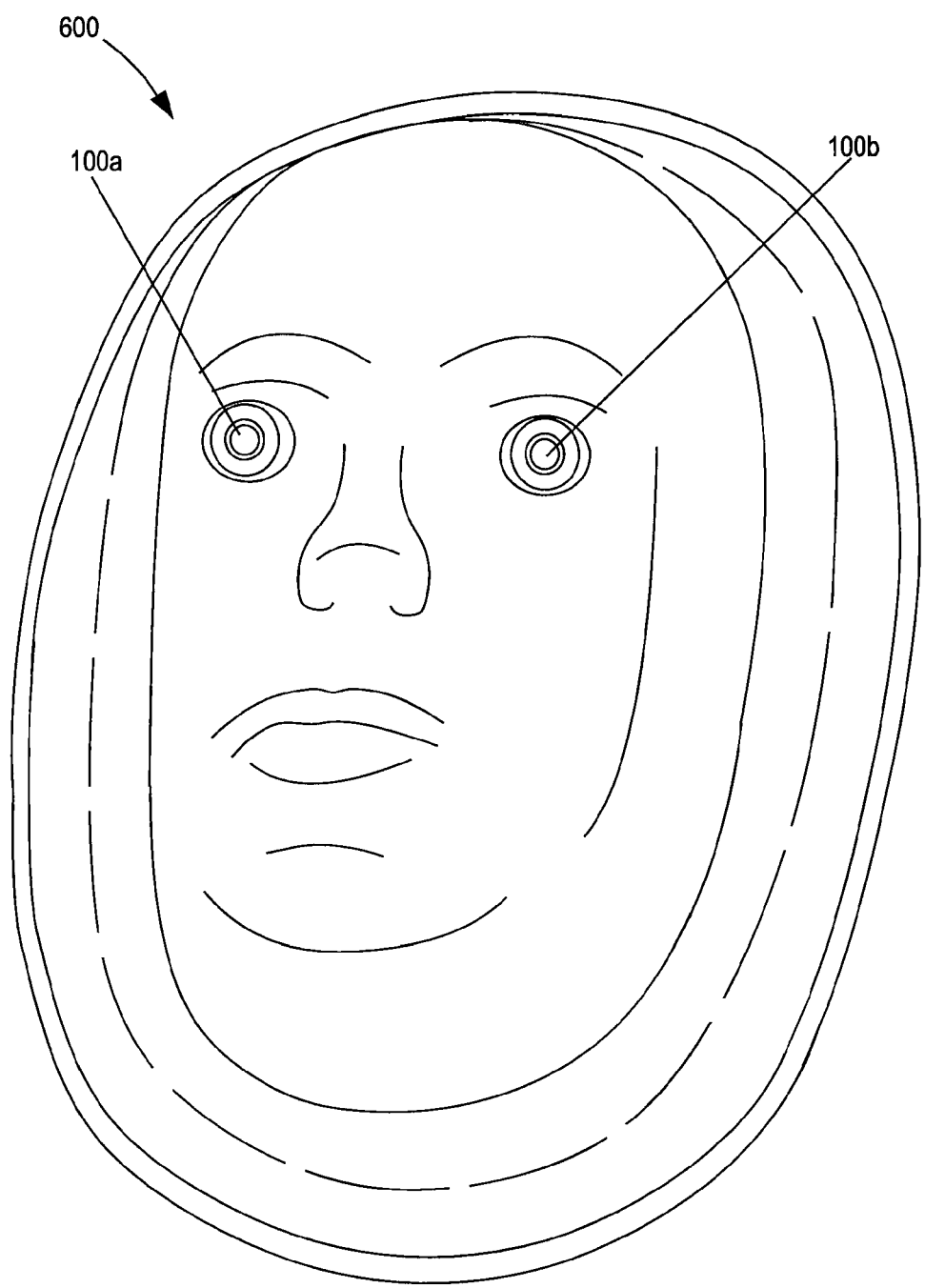
FIG. 7B is a perspective view of the face manikin of FIG. 6A with two model human eyes removeably affixed thereto.

Referring now to FIGS. 7A and 7B, FIG. 7A shows Applicants' model eye 100 removeably attached to face manikin 600 such that cornea portion 110 and a portion of sclera 120 extend through eye socket 630. In the illustrated embodiment of FIG. 7A, distal end 654 of flexible strap 650 is shown threaded through buckle 640, such that flexible strap 650 fixtures model eye in place. The model eye 100 element can be used for one or more surgical procedures, and then replaced with a new model eye 100. The used model eyes can be retained for evaluation. Thereafter, the used model eyes 100 can be classified as solid waste rather than as a hazardous waste or infectious waste for purposes of the federal Occupational Safety and Health Act, Resource Conservation and Recovery Act, and the various state-law analogs.

While the preferred embodiments of the present invention have been illustrated in detail, it should be apparent that modifications and adaptations to those embodiments may occur to one skilled in the art without departing from the scope of the present invention as set fort in the following claims.

We claim:

1. A model human eye for use in practicing surgical techniques, comprising:
   a bowl-shaped substrate;
   a plurality of retinal layers stacked on said bowl-shaped substrate successively, wherein said plurality of layers comprises:
      a first retinal layer comprising a first color;
      a second retinal layer disposed over said first layer, wherein said second layer comprises a second color; and
      a third retinal layer disposed over said second layer, wherein said third layer comprises a third color, wherein the first color, the second color, and the third color differ;
   an integrally molded hemi-spherical-shaped top portion comprising a visually transparent cornea portion and a visually opaque sclera portion comprising an inner surface, wherein:
      said cornea portion comprises a center point and a peripheral edge;
      said center point is formed to comprise a minimum thickness between about 0.45 mm and about 0.55 mm; and
      said peripheral edge is formed to comprise a maximum thickness of between about 0.6 mm and about 0.8 mm;
   an annular iris continuously attached to said inner surface and extending inwardly therefrom;
   a lenticular bag continuously attached to said iris, wherein said iris in combination with said lenticular bag and said cornea portion define an anterior chamber;
   a first fluid disposed in said anterior chamber, wherein said first fluid comprises a first viscosity;
   wherein said top portion is attached to said base portion to define a posterior chamber; and
   a second fluid disposed in said posterior chamber, wherein said second fluid comprises a second viscosity, wherein said second viscosity is greater than said first viscosity;
   wherein said model human eye is structurally suited for practicing surgical techniques selected from the group consisting of:
      a retinal membrane peel;
      treatment of a choriodal neovascular membrane;
      argon laser trabeculoplasty; and
      Descemets Stripping Endothelial Keratoplasty.

2. The model human eye of claim 1, wherein:
   said bowl-shaped substrate is formed to include a dimple extending inwardly, wherein said dimple mimics a macula portion of a normal human eye;
   said first layer comprises an inwardly extending dimple;
   said second layer comprises an inwardly extending dimple;
   said third layer comprises an inwardly extending dimple.

3. The model human eye of claim 1, wherein said first retinal layer, said second retinal layer, and said third retinal layer, each comprises a thickness between 0.0002 inches to 0.0006 inches.

4. The model human eye of claim 1, wherein said lenticular bag comprises:
an anterior capsular membrane;
a posterior capsular membrane attached to said anterior capsular membrane to define an enclosed space;
a third fluid disposed in said enclosed space.

5. The model human eye of claim 4, wherein:
said anterior capsular membrane comprises a thickness of about 0.01 mm; and
said posterior capsular membrane comprises thickness of about 0.25 mm.

6. The model human eye of claim 5, wherein said third fluid comprises gelatin, agar, propylene glycol, and water.

7. The model human eye of claim 6, wherein said third fluid further comprises a colorant.

8. The model human eye of claim 7, wherein said lenticular bag comprises a maximum thickness of about 3 mm.

9. The model human eye of claim 7, wherein said lenticular bag comprises a maximum thickness of about 5 mm.

10. The model human eye of claim 1, further comprising a trabecular meshwork disposed adjacent the attachment of said iris to said inner surface.

11. The model human eye of claim 1, further comprising an endothelium layer disposed at a posterior portion of said cornea.

12. A method to practice surgical techniques on a model human eye, comprising:
supplying a model human eye comprising:
a bowl-shaped substrate;
a plurality of retinal layers stacked on said bowl shaped substrate successively,
wherein said plurality of layers comprises:
a first retinal layer comprising a first color;
a second retinal layer disposed over said first layer, wherein said second layer comprises a second color; and
a third retinal layer disposed over said second layer, wherein said third layer comprises a third color, wherein the first color, the second color, and the third color differ;
an integrally molded hemi-spherical-shaped top portion comprising a cornea portion and a visually opaque sclera portion comprising an inner surface, wherein:
said cornea portion comprises a center point and a peripheral edge;
said center point is formed to comprise a minimum thickness between about 0.45 mm and about 0.55 mm; and
said peripheral edge is formed to comprise a maximum thickness of between about 0.6 mm and about 0.8 mm;
an annular iris continuously attached to said inner surface and extending inwardly therefrom;
a lenticular bag continuously attached to said iris, wherein said iris in combination with said lenticular bag and with a portion of said inner surface disposed above said iris define an anterior chamber;
a first fluid disposed in said anterior chamber, wherein said first fluid comprises a first viscosity;
wherein said top portion is attached to said base portion to define a posterior chamber;
and
a second fluid disposed in said posterior chamber, wherein said second fluid comprises a second viscosity, wherein said second viscosity is greater than said first viscosity;
wherein said model human eye is structurally suited for practicing surgical techniques selected from the group consisting of:
a retinal membrane peel;
treatment of a choriodal neovascular membrane;
argon laser trabeculoplasty; and
Descemets Stripping Endothelial Keratoplasty;
supplying a face manikin formed to mimic a human-face comprising a raised, face-mimicking structure surrounded by a trough, wherein said face-mimicking structure comprises two eye sockets extending therethrough, an exterior surface, and an interior surface, two attachment straps wherein each attachment strap comprises a first end attached to said interior surface adjacent one of the eye sockets, two attachment buckles wherein each attachment buckle attached to said interior surface adjacent one of the eye sockets;
wherein said exterior surface comprises:
an eye brow element disposed adjacent a first side of each eye socket;
a nose feature disposed between the eye sockets and adjacent a second an opposing side of the eye sockets;
and a mouth feature disposed adjacent the nose feature;
said method further comprising:
positioning said model eye against the interior surface of said face-mimicking structure such that the cornea portion extends outwardly from an eye socket; and
releasably attaching said model eye to said face-mimicking structure using an attachment strap and an attachment buckle.

13. The method of claim 12, further comprising:
practicing a surgical procedure using said model eye; and
removing said used model eye from said face-mimicking structure.

14. The method of claim 12, wherein said method further comprises:
cutting said third retinal layer into pieces; and
removing said pieces using suction.

15. The method of claim 14, wherein:
said third retinal layer is removed; and
no portion of said second retinal layer is removed.

16. The method of claim 12, wherein said model eye further comprises a trabecular meshwork disposed around a periphery of said cornea, said method further comprising directing laser energy through said cornea and onto said trabecular meshwork.

17. The method of claim 16, further comprising:
supplying a procedure contact lens comprising a reflective member;
providing a lasing device;
emitting laser energy from said lasing device;
reflecting said laser energy from said reflector onto said trabecular meshwork.

18. The method of claim 12, wherein said model eye further comprises an endothelial layer disposed on a posterior portion of said cornea, said method further comprising:
stripping away said endothelial layer; and
transplanting a replacement endothelial layer.

* * * * *